(12) United States Patent
Moriyama (10) Patent No.: US 9,944,157 B2
(45) Date of Patent: Apr. 17, 2018

(54) WINDOW MOLDING FOR VEHICLE

(71) Applicant: KABUSHIKI KAISHA TOYOTA JIDOSHOKKI, Kariya-shi, Aichi-ken (JP)

(72) Inventor: Akira Moriyama, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 15/124,719

(22) PCT Filed: Feb. 10, 2015

(86) PCT No.: PCT/JP2015/053604
§ 371 (c)(1),
(2) Date: Sep. 9, 2016

(87) PCT Pub. No.: WO2015/137030
PCT Pub. Date: Sep. 17, 2015

(65) Prior Publication Data
US 2017/0015182 A1   Jan. 19, 2017

(30) Foreign Application Priority Data
Mar. 11, 2014   (JP) ................................ 2014-047659

(51) Int. Cl.
*B60J 10/02*   (2006.01)
*B60J 10/50*   (2016.01)
(Continued)

(52) U.S. Cl.
CPC ................. *B60J 10/50* (2016.02); *B60J 1/02* (2013.01); *B60J 10/345* (2016.02); *B60J 10/70* (2016.02)

(58) Field of Classification Search
CPC ........... B60J 10/50; B60J 10/70; B60J 10/345
(Continued)

(56) References Cited

U.S. PATENT DOCUMENTS 4,332,412 A * 6/1982 Nakazawa ............. B60J 10/265
296/29
4,765,673 A * 8/1988 Frabotta ................. B60J 10/235
296/201

(Continued)

FOREIGN PATENT DOCUMENTS

| JP | 7-30112 U | 6/1995 |
|---|---|---|
| JP | 2002-526316 A | 8/2002 |
| JP | 2007-290525 A | 11/2007 |

OTHER PUBLICATIONS

International Search Report of PCT/JP2015/053604, dated May 12, 2015. [PCT/ISA/210].

*Primary Examiner* — Pinel E Romain
(74) *Attorney, Agent, or Firm* — Sughrue Mion, PLLC (57) ABSTRACT

A window molding includes a main body and a lip part. The body includes an upper surface configured to be affixed to an inner surface of a window and the body is configured to be arranged between the inner surface and a bottom surface part of a frame. The lip part is provided on a portion of the body located on the peripheral wall part side of the frame. In an assembled state, at least a portion of the lip part extends to be closer to the bottom surface part as approaching from the body side to the peripheral wall part side, and a distance from the upper surface to the bottom surface part is defined as L. When the molding is in an unloaded state, the lip part has a portion in which the distance from the upper surface is longer than L.

8 Claims, 6 Drawing Sheets

(51) Int. Cl.
*B60J 10/34* (2016.01)
*B60J 10/70* (2016.01)
*B60J 1/02* (2006.01)

(58) Field of Classification Search
USPC .......................................................... 296/93
See application file for complete search history.

(56) References Cited

U.S. PATENT DOCUMENTS

| | | | | |
|---|---|---|---|---|
| 5,095,669 | A | * | 3/1992 | Kunert .................. B29C 43/206 52/208 |
| 5,384,995 | A | * | 1/1995 | Kunert .................. B29C 43/206 296/84.1 |
| 5,752,352 | A | * | 5/1998 | Goto ........................ B60J 10/24 296/146.15 |
| 6,017,038 | A | * | 1/2000 | Wato ........................ B60J 10/25 277/630 |
| 2002/0153743 | A1 | | 10/2002 | Cornils et al. |
| 2006/0032181 | A1 | * | 2/2006 | Recker .................... B60J 10/18 52/716.5 |

* cited by examiner

WINDOW MOLDING FOR VEHICLE

CROSS REFERENCE TO RELATED APPLICATIONS

This application is a National Stage of International Application No. PCT/JP2015/053604 filed Feb. 10, 2015, claiming priority based on Japanese Patent Application No. 2014-047659, filed Mar. 11,2014, the contents of all of which are incorporated herein by reference in their entirety.

TECHNICAL FIELD

The present invention relates to a window molding for a vehicle.

BACKGROUND ART

As disclosed in Japanese Patent Laying-Open No. 2007-290525 (PTD 1), a window molding for a vehicle provided around a window (e.g., a front window) of an automobile is known. The window molding for a vehicle closes a gap formed between an edge of the window and a window frame of a vehicle body. Visual recognition of a welding mark, a surface of the vehicle body and the like through this gap is prevented by providing the window molding for a vehicle. The window molding for a vehicle can improve the outer appearance of the vehicle.

CITATION LIST

Patent Document

PTD 1: Japanese Patent Laying-Open No. 2007-290525

SUMMARY OF INVENTION

Technical Problem

The size of the gap formed between the edge of the window and the window frame of the vehicle body is easily affected by an error occurring during assembly of the window, an error occurring during construction of the window frame of the vehicle body, and the like. When the window includes a member such as resin that is more heat-shrinkable than glass, the gap may increase or decrease in size after assembly. When the window molding for a vehicle cannot tolerate such change (variations) in the size of the gap, problems such as deterioration of the outer appearance and occurrence of an unusual noise during traveling are likely to arise.

An object of the present invention is to provide a window molding for a vehicle in which occurrence of the above-described problems can be suppressed as compared with the conventional art, even when the size of the gap formed between the edge of the window and the window frame of the vehicle body changes.

Solution to Problem

A window molding for a vehicle is configured to be provided between a vehicle window and a window frame including a bottom surface part opposing to an inner surface of the vehicle window and a peripheral wall part opposing to an edge of the vehicle window, the window molding including: a main body including an upper surface configured to be affixed to the inner surface, the main body being configured to be arranged between the inner surface and the bottom surface part; and a lip part provided on a portion of the main body located on the peripheral wall part side, when the vehicle window and the window molding are assembled on the window frame, at least a portion of the lip part having a shape extending to be closer to the bottom surface part as approaching from the main body side to the peripheral wall part side, when the vehicle window and the window molding are assembled on the window frame, a distance from the upper surface of the main body to the bottom surface part being defined as L, and when the window molding is in an unloaded state where the vehicle window and the window molding are not assembled on the window frame, the lip part of the window molding having a portion in which the distance from the upper surface of the main body is longer than L.

Advantageous Effects of Invention

According to the above-described configuration, even when the size of the gap formed between the edge of the window and the window frame of the vehicle body changes, the problems such as deterioration of the outer appearance and occurrence of an unusual noise during traveling can be suppressed because the lip part easily comes into contact with the bottom surface part of the window frame.

DESCRIPTION OF EMBODIMENTS

[Related Art]

Before describing embodiments, the art related to the embodiments will be described with reference to FIGS. 1 to 7. In the following description, the same or corresponding components are denoted by the same reference numerals, and redundant description may not be repeated.

(First Related Art)

Figure 1:
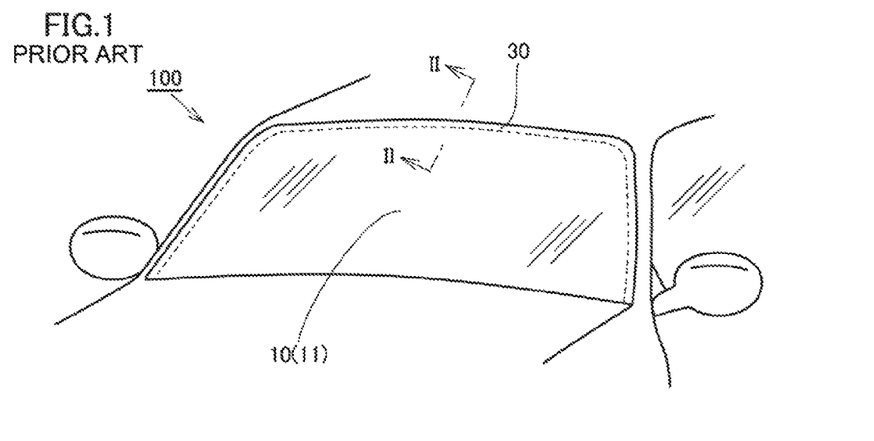
FIG. 1 is a perspective view showing a vehicle including a window molding for a vehicle in a first related art.
Figure 2:
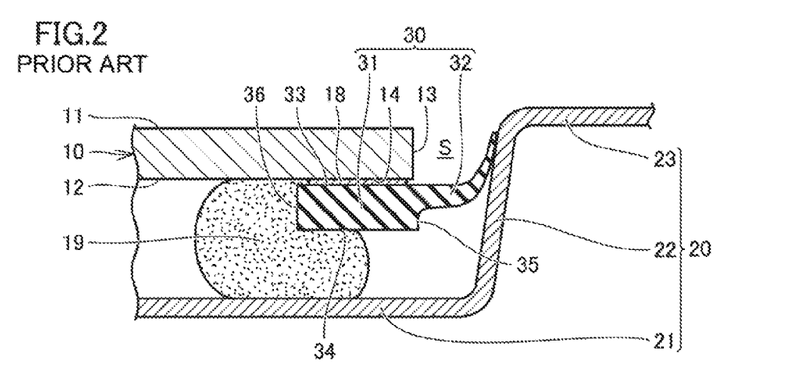
FIG. 2 is a cross-sectional view taken along line II-II in FIG. 1.

FIG. 1 is a perspective view showing a vehicle 100 including a window molding for a vehicle (hereinafter simply referred to as "window molding") in a first related art. FIG. 2 is a cross-sectional view taken along line II-II in FIG. 1. As shown in FIGS. 1 and 2, the vehicle 100 (FIG. 1) includes a window 10, a window frame 20 (FIG. 2) and a window molding 30.

Referring mainly to FIG. 2, the window 10 includes an outer surface 11, an inner surface 12 and an edge 13. The outer surface 11 is exposed to the outside of the vehicle, and the inner surface 12 is exposed to a vehicle compartment. The edge 13 is located at an outermost periphery of the window 10, and opposes to a peripheral wall part 22 of the window frame 20 described next, with a spacing (a gap S) interposed therebetween. The window frame 20 includes a bottom surface part 21, the peripheral wall part 22 and an external surface part 23. The bottom surface part 21 has a not-shown opening on the inner side thereof, and the window 10 is arranged to cover this opening. The peripheral wall part 22 stands upright from an outer end of the bottom surface part 21 and extends from this outer end in a direction away from the vehicle compartment. The external surface part 23 is continuous to a tip of the peripheral wall part 22 in the extending direction and forms an external surface of the vehicle 100.

The window molding 30 is provided between the window 10 and the window frame 20. The window molding 30 is of decorative part-less type and is arranged so as not to overlap with the outer surface 11 of the window 10. Specifically, the window molding 30 includes a main body 31 and a lip part 32. The main body 31 has an upper surface 33, a lower surface 34, and side surfaces 35 and 36, and is affixed to the inner surface 12 (near an outer peripheral part 14) of the window 10 with a double-sided tape 18. The lip part 32 has a shape extending from the side surface 35 to the peripheral wall part 22 side.

Together with the window molding 30, the window 10 is arranged on the inner side of the window frame 20 such that the inner surface 12 of the window 10 opposes to the bottom surface part 21 of the window frame 20. With the window 10 being positioned by a not-shown boss, the window 10 is fixed to a vehicle body of the vehicle 100 by using an adhesive 19 or the like such as urethane. At this time, the lip part 32 comes into pressure contact with the peripheral wall part 22 of the window frame 20 and closes the gap S formed between the edge 13 of the window 10 and the peripheral wall part 22 of the window frame 20.

Figure 3:
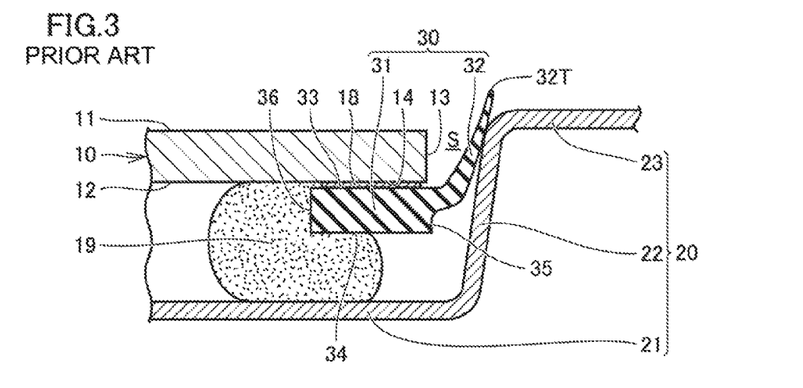
FIG. 3 is a cross-sectional view showing one example of an assembled state of the window molding for the vehicle in the first related art.

Referring to FIG. 3, as described in the beginning, the size of the gap S formed between the edge 13 of the window 10 and the peripheral wall part 22 of the window frame 20 is easily affected by an error occurring during assembly of the window 10, an error occurring during construction of the window frame 20, and the like. For example, when the gap S becomes narrower, a tip 32T of the lip part 32 may protrude outward from the external surface part 23 of the window frame 20 (a state shown in FIG. 3). This causes not only deterioration of the outer appearance but also occurrence of an unusual noise such as a wind noise.

(Second Related Art)

Figure 4:
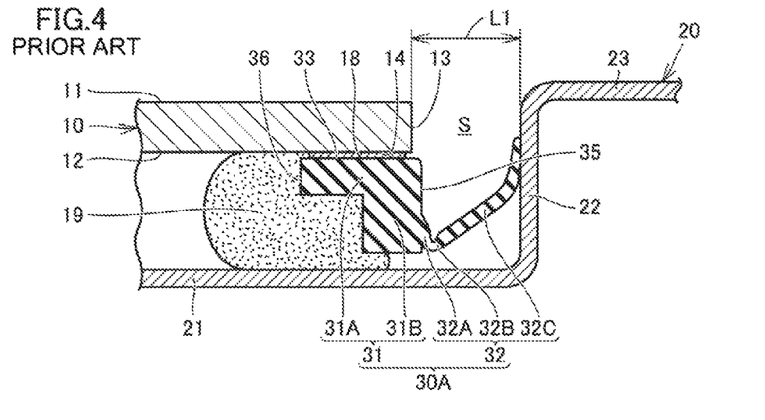
FIG. 4 is a cross-sectional view showing a window molding for a vehicle in a second related art.

FIG. 4 is a cross-sectional view showing a window molding 30A in a second related art. The main body 31 of the window molding 30A has a head part 31A and a leg part 31B. The head part 31A has the upper surface 33 opposing to the inner surface 12 of the window 10. The leg part 31B is formed on the lower surface side of the head part 31A (on the side of the head part 31A opposite to the upper surface 33).

The lip part 32 of the window molding 30A has a root part 32A, a bent part 32B and an extending part 32C. The bent part 32B is located between the root part 32A and the extending part 32C. A portion of the lip part 32 located on the root part 32A side with respect to the bent part 32B extends in a downward L shape from the side surface 35 of the main body 31. A portion of the lip part 32 located on the extending part 32C side with respect to the bent part 32B extends in an upward U shape.

Figure 5:
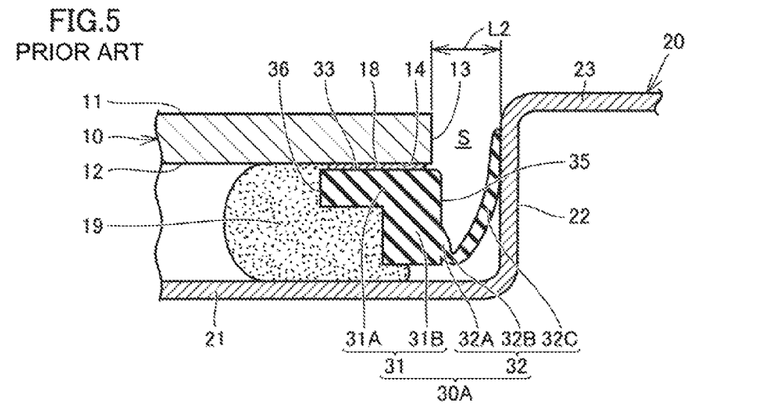
FIG. 5 is a cross-sectional view showing one example of an assembled state of the window molding for the vehicle in the second related art.

Referring to FIG. 5, the window molding 30A is applied to a vehicle in which the size of the gap S is a width L2 (FIG. 5). The width L2 is smaller than a width L1 (FIG. 4). In this case, according to the window molding 30A, the extending part 32C of the lip part 32 abuts the peripheral wall part 22 of the window frame 20, and thus, the extending part 32C is pushed to the main body 31 side. Since the lip part 32 is bent at the bent part 32B serving as a bending point, the lip part 32 hardly protrudes outward from the external surface part 23 of the window frame 20 as shown in FIG. 3.

Figure 6:
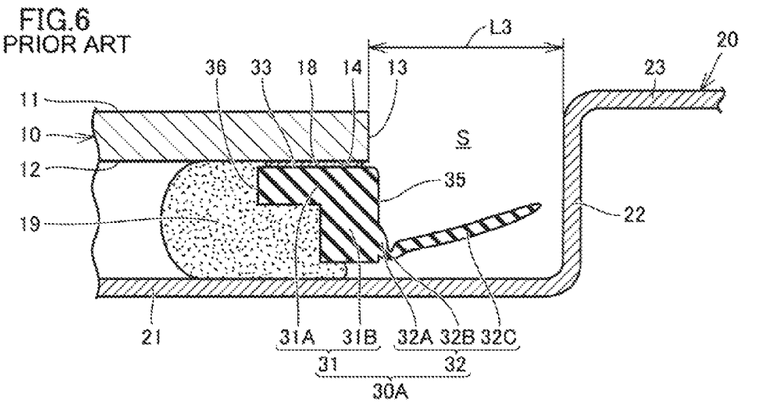
FIG. 6 is a cross-sectional view showing another example of the assembled state of the window molding for the vehicle in the second related art.

Referring to FIG. 6, the window molding 30A is applied to a vehicle in which the size of the gap S is a width L3 (FIG. 6). The width L3 is greater than the width L1 (FIG. 4). When the degree of change (variations) in the gap S is small, the window molding 30A can be expected to fulfill its original function. However, when the gap S is large as shown in FIG. 6, the lip part 32 is separated from both the bottom surface part 21 and the peripheral wall part 22, and thus, there are concerns about not only deterioration of the outer appearance but also occurrence of a wind noise and the like.

Figure 7:
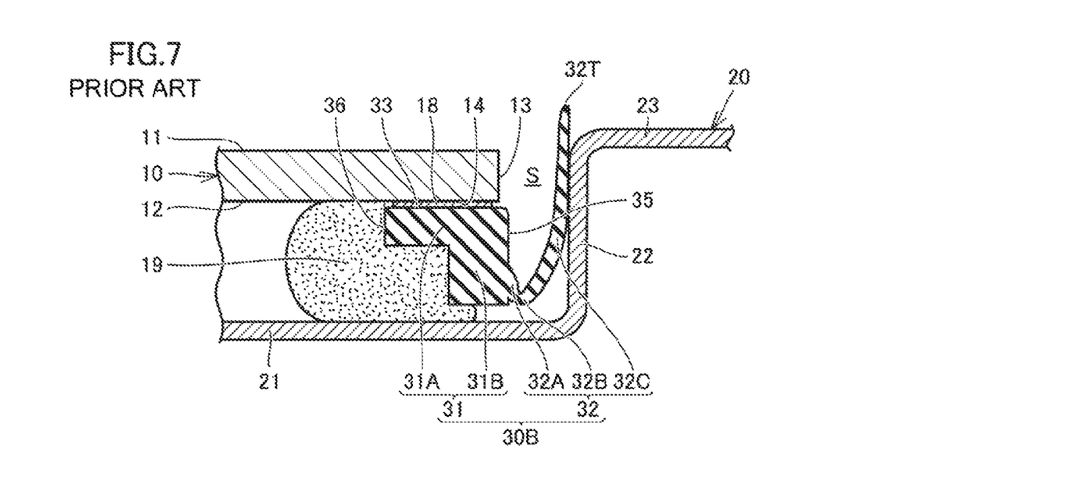
FIG. 7 is a cross-sectional view showing one example of an assembled state of a window molding for a vehicle in a modification of the second related art.

Assuming that, like a window molding 30B shown in FIG. 7, a length of the extending part 32C of the lip part 32 is longer than the case of the window molding 30A (FIG. 6), according to this window molding 30B, even when the gap S is large, the gap S can be closed. However, when the gap S is small, it is concerned that the tip 32T of the lip part 32 protrudes outward from the external surface part 23 of the window frame 20, similarly to the case described with reference to FIG. 3.

[Embodiments]

The embodiments will be described below with reference to the drawings. When the number, an amount and the like are mentioned, the scope of the present invention is not necessarily limited to that number, that amount and the like, unless otherwise specified. In the following description, the same or corresponding components are denoted by the same reference numerals, and redundant description may not be repeated.

(First Embodiment)

Figure 8:
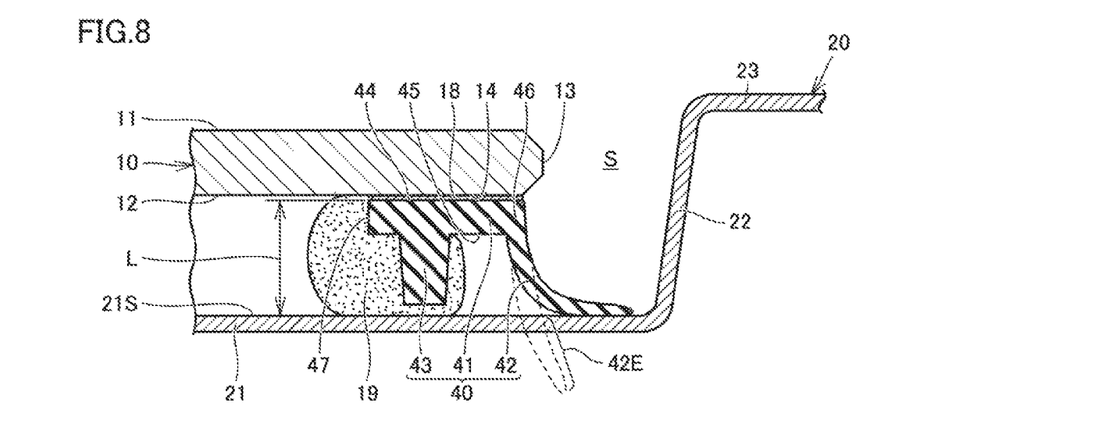
FIG. 8 is a cross-sectional view showing a window molding for a vehicle in a first embodiment.

FIG. 8 is a cross-sectional view showing a window molding 40 in a first embodiment. Similarly to the case of each related art described above, the window molding 40 is provided between the window 10 and the window frame 20. Similarly to the case of each related art described above, the window 10 includes the outer surface 11, the inner surface 12 and the edge 13. The window frame 20 includes the bottom surface part 21, the peripheral wall part 22 and the external surface part 23.

The window molding 40 is of decorative part-less type and is arranged so as not to overlap with the outer surface 11 of the window 10. Specifically, the window molding 40 includes a main body 41, a lip part 42 and a dam part 43, and is formed from an extrusion of synthetic resin or the like. The main body 41 has an upper surface 44, a lower surface 45 and a side surface 47. The main body 41 is arranged between the inner surface 12 of the window 10 and the bottom surface part 21 of the window frame 20. The upper surface 44 of the main body 41 is affixed to the inner surface 12 (near the outer peripheral part 14) of the window 10 with the adhesive, e.g., the double-sided tape 18.

The lip part 42 is provided on a portion 46 of the main body 41 located on the peripheral wall part 22 side, and extends outward from a position adjacent to the upper surface 44 of the main body 41. When the window 10 and the window molding 40 are assembled on the window frame 20 (assembled state) (in a state shown by a solid line in FIG. 8), at least a portion of the lip part 42 has a shape extending to be closer to the bottom surface part 21 of the window frame 20 as approaching from the main body 41 side to the peripheral wall part 22 side of the window frame 20. According to the lip part 42 of the present embodiment, substantially the whole of the lip part 42 has a shape extending to be closer to the bottom surface part 21 of the window frame 20 as approaching from the main body 41 side to the peripheral wall part 22 side of the window frame 20. The lip part 42 shown by a dotted line in FIG. 8 shows a state in which the window frame 20 is imaginarily removed from the above-described assembled state and the lip part 42 is deformed into the original state due to its elastic resilience.

Here, when the window 10 and the window molding 40 are assembled on the window frame 20 (in the state shown by the solid line in FIG. 8), a distance from the upper surface 44 of the main body 41 to the bottom surface part 21 of the window frame 20 is defined as L (FIG. 8), and further, a state in which the window 10 and the window molding 40 are not assembled on the window frame 20 is defined as an unloaded state. When the window molding 40 is in this unloaded state, the lip part 42 of the window molding 40 has a portion 42E in which the distance from the upper surface 44 of the main body 41 is longer than L described above. The distance L herein refers to a distance defined in a direction orthogonal to an upper surface portion of the upper surface 44 of the window molding 40 located closer to the peripheral wall part 22 (in other words, an upper surface portion of the portion 46 of the main body 41 located on the peripheral wall part 22 side).

Figure 9:
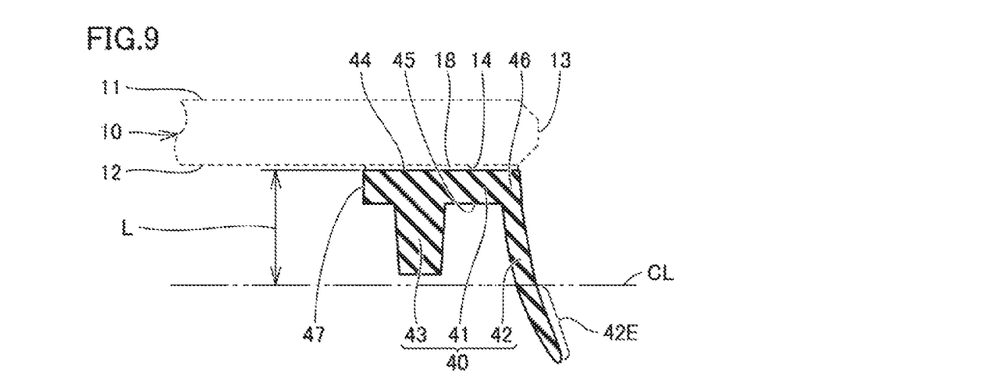
FIG. 9 is a cross-sectional view showing a state when the window molding for the vehicle in the first embodiment is in an unloaded state.

Referring to FIG. 9, the unloaded state herein can also be described as a state in which the window frame 20 is imaginarily removed from the state in which the window 10 and the window molding 40 are assembled on the window frame 20 (assembled state). An imaginary line CL (FIG. 9) is drawn at a location where a surface 21 S (FIG. 8) of the bottom surface part 21 of the window frame 20 is located in the assembled state. Then, the lip part 42 of the window molding 40 that is in the unloaded state has a length extending beyond this imaginary line CL, and the portion 42E in which the distance from the upper surface 44 of the main body 41 is longer than L described above is located beyond this imaginary line CL and reaches the vehicle compartment interior side with respect to imaginary line CL.

(Function and Effect)

Figure 10:
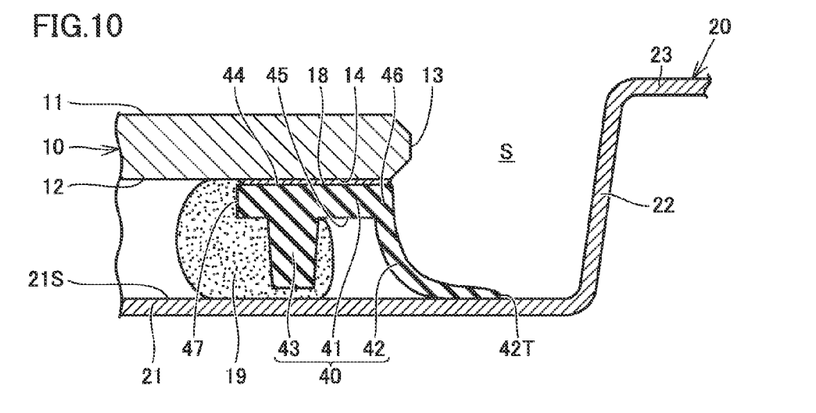
FIG. 10 is a cross-sectional view showing one example of an assembled state of the window molding for the vehicle in the first embodiment.

Referring to FIG. 10, the lip part 42 of the window molding 40 in the present embodiment has a length and a shape extending beyond the above-described imaginary line CL when the window molding 40 is in the unloaded state. Furthermore, at least a portion of the lip part 42 has a shape extending to be closer to the bottom surface part 21 of the window frame 20 as approaching from the main body 41 side to the peripheral wall part 22 side of the window frame 20. With this configuration, the lip part 42 is more easily pressed against the surface 21S of the bottom surface part 21 when the window molding 40 is in the assembled state.

Even when the gap S is large as shown in FIG. 10, the lip part 42 of the window molding 40 can be pressed against the surface 21S of the bottom surface part 21. The window molding 30A described with reference to FIG. 6 does not have a shape extending beyond the above-described imaginary line CL when the window molding 30A is in the unloaded state. Therefore, when the gap S is large, the lip part 32 (FIG. 6) is separated from both the bottom surface part 21 and the peripheral wall part 22, and thus, there are concerns about not only deterioration of the outer appearance but also occurrence of a wind noise and the like. In contrast, according to the window molding 40 in the present embodiment, even when the gap S is large, contact with the surface 21S of the bottom surface part 21 can be maintained, and thus, the deterioration of the outer appearance and the occurrence of a wind noise can be effectively suppressed.

Figure 11:
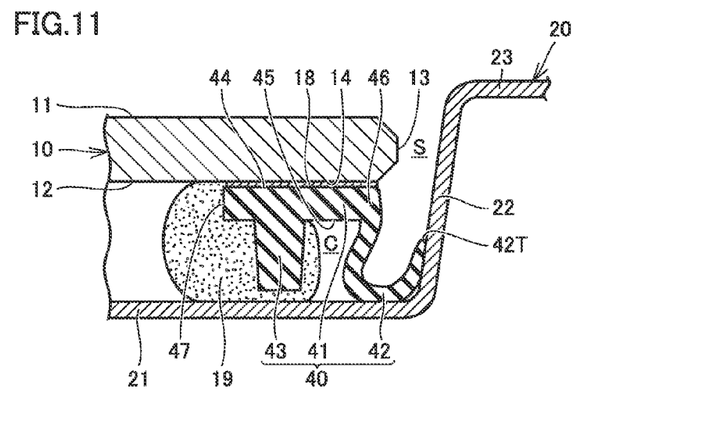
FIG. 11 is a cross-sectional view showing another example of the assembled state of the window molding for the vehicle in the first embodiment.

Referring to FIG. 11, when the gap S is small, the lip part 42 is pushed by the peripheral wall part 22, so that the lip part 42 forms a J shape, for example. Similarly to the case in which the gap S is large, the lip part 42 maintains contact with the bottom surface part 21. Even when the gap S is small, the lip part 42 can maintain contact with the bottom surface part 21, and thus, the deterioration of the outer appearance and the occurrence of a wind noise can be effectively suppressed.

As shown in FIG. 11, depending on the size of the gap S and the length of the lip part 42, the lip part 42 comes into contact with not only the bottom surface part 21 but also the peripheral wall part 22. As described above, the lip part 42 has a length and a shape extending beyond the above-described imaginary line CL when the window molding 40 is in the unloaded state. Furthermore, at least a portion of the lip part 42 has a shape extending to be closer to the bottom surface part 21 of the window frame 20 as approaching from the main body 41 side to the peripheral wall part 22 side of the window frame 20. With this configuration, even when the gap S is small, the lip part 42 hardly protrudes outward from the external surface part 23 of the window frame 20.

Depending on the size of the gap S and the length of the lip part 42, a space (housing part C) formed between the dam part 43 and the lip part 42 is exploited. When the lip part 42 is pushed by the peripheral wall part 22 and the lip part 42 becomes deformed, a portion of the lip part 42 enters the housing part C. According to this configuration, the length of the lip part 42 moves away from the external surface part 23 by an amount of entry into the housing part C. Therefore, outward protrusion of the lip part 42 from the external surface part 23 of the window frame 20 can be further suppressed.

(Modification)

Figure 12:
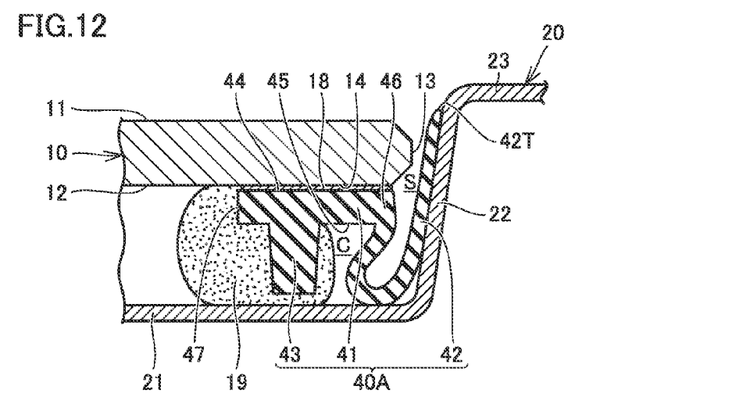
FIG. 12 is a cross-sectional view showing one example of an assembled state of a window molding for a vehicle in a modification of the first embodiment.

Like a window molding 40A shown in FIG. 12, contact of the edge 13 of the window 10 with the peripheral wall part 22 of the window frame 20 may be suppressed by increasing the length of the lip part 42. According to the window molding 40A, even when the gap S becomes narrower due to an influence of heat shrinkage and the like and the edge 13 of the window 10 comes closer to the peripheral wall part 22 of the window frame 20, the lip part 42 of the window molding 40A enters a space between the edge 13 of the window 10 and the peripheral wall part 22 of the window frame 20. Due to the presence of the lip part 42, contact between the window 10 and the peripheral wall part 22 becomes less likely, and thus, the occurrence of damage (such as, for example, peel-off of a coating) in the window 10 and the peripheral wall part 22 can be suppressed.

[Second Embodiment]

Figure 13:
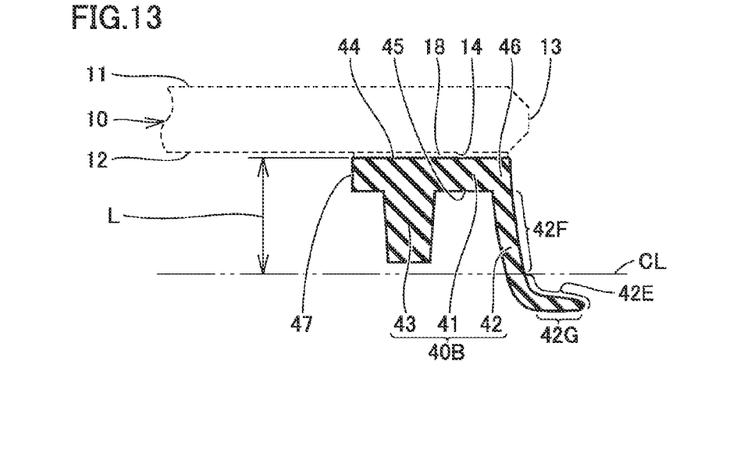
FIG. 13 is a cross-sectional view showing a state when a window molding for a vehicle in a second embodiment is in an unloaded state.

In the above-described first embodiment (FIG. 9), substantially the whole of the lip part 42 has a shape extending to be closer to the bottom surface part 21 of the window frame 20 as approaching from the main body 41 side to the peripheral wall part 22 side of the window frame 20. Referring to FIG. 13, in a window molding 40B of the present embodiment, only a portion 42F of the lip part 42 close to the main body 41 has a shape extending to be closer to the bottom surface part 21 of the window frame 20 as approaching from the main body 41 side to the peripheral wall part 22 side of the window frame 20.

On the other hand, a portion 42G formed at a tip of the lip part 42 does not have a shape extending to be closer to the bottom surface part 21 of the window frame 20, and has a shape extending substantially parallel to the bottom surface part 21 (imaginary line CL) of the window frame 20. Even with this configuration, similarly to the case of the above-described first embodiment, the lip part 42 can maintain contact with the surface 21S of the bottom surface part 21. Therefore, the deterioration of the outer appearance and the occurrence of a wind noise can be effectively suppressed.

[Third Embodiment]

Figure 14:
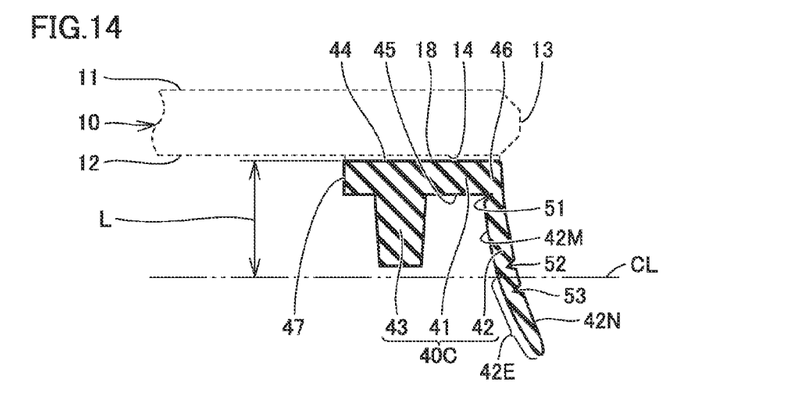
FIG. 14 is a cross-sectional view showing a state when a window molding for a vehicle in a third embodiment is in an unloaded state.

Referring to FIG. 14, in a window molding 40C of the present embodiment, notches 51, 52 and 53 are provided in the lip part 42. The lip part 42 has an internal surface 42M and an external surface 42N located on a side farther away from the internal surface 42M when viewed from the vehicle compartment. The notch 51 is provided in the internal surface 42M and is provided in a base part of the lip part 42 located between the main body 41 and the lip part 42.

The notches 52 and 53 are provided in the external surface 42N. When the window molding 40C is in the unloaded state, the notch 52 is formed at a position where the distance from the upper surface 44 of the main body 41 is shorter than L. In other words, when the window molding 40C is in the unloaded state, the notch 52 is located on the main body 41 side with respect to the imaginary line CL. On the other hand, when the window molding 40C is in the unloaded state, the notch 53 is formed at a position where the distance from the upper surface 44 of the main body 41 is longer than L. In other words, when the window molding 40C is in the unloaded state, the notch 53 is located on the opposite side of the main body (on the vehicle compartment side) with respect to the imaginary line CL.

By providing notches 51, 52 and 53, the lip part 42 bends easily. Even when the size of the above-described gap (gap S) changes due to an influence of heat shrinkage and the like, the lip part 42 can deform in a flexible manner and the window molding 40C can fulfill its original function. In addition, since the lip part 42 bends easily, an assembly load caused by the reaction force of the lip part 42 when the window 10 is assembled on the window frame 20 can be reduced. All of notches 51 to 53 do not necessarily need to be provided in the lip part 42. The notches may be provided at an optimum site in accordance with the elasticity of the lip part 42, the length and the shape of the lip part 42, and the like.

[Fourth Embodiment]

Figure 15:
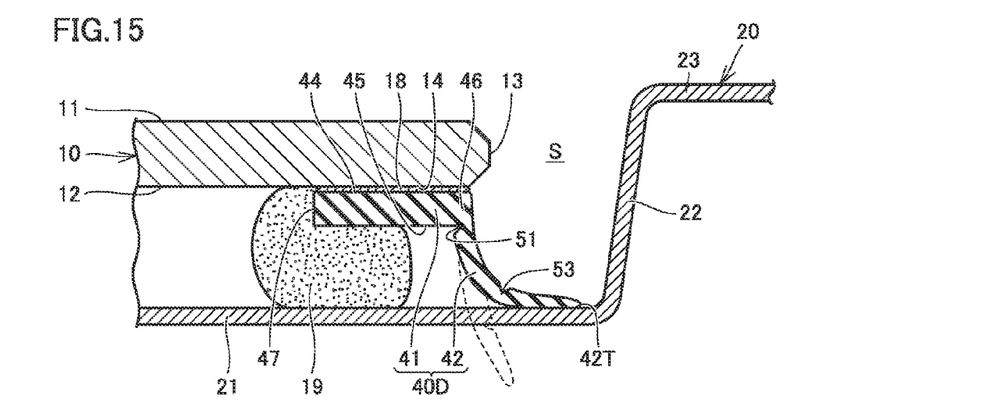
FIG. 15 is a cross-sectional view showing a window molding for a vehicle in a fourth embodiment.

Unlike the window moldings in the above-described embodiments, a window molding 40D shown in FIG. 15 does not have the dam part 43 (see FIG. 8 and the like). The dam part 43 may perform the positioning function on the edge 13 side of the window 10. When the window 10 can be positioned by a not-shown boss and the like, or in the case of the other layout of each member, the window molding may not be provided with the dam part 43.

Even when the dam part 43 is not provided, the function and effect similar to those of the above-described embodiments can be obtained by adopting such a configuration that the lip part 42 has a length and a shape extending beyond the imaginary line CL (not shown) and at least a portion of the lip part 42 has a shape extending to be closer to the bottom surface part 21 of the window frame 20 as approaching from the main body 41 side to the peripheral wall part 22 side of the window frame 20.

[Fifth Embodiment]

Figure 16:
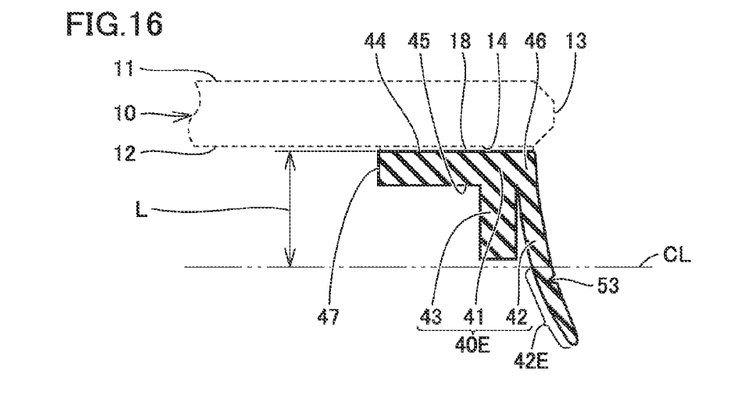
FIG. 16 is a cross-sectional view showing a state when a window molding for a vehicle in a fifth embodiment is in an unloaded state.

A window molding 40E shown in FIG. 16 is provided with the dam part 43 at a portion of the main body 41 close to the peripheral wall part 22 and does not have the housing part C. When the housing part C is not provided, an acceptable range of deformation of the lip part 42 becomes smaller when the size of the above-described gap (gap S) is small. However, depending on the layout of each member and the like, the dam part 43 may be configured as described above.

Even in this configuration, the function and effect similar to those of the above-described embodiments can be obtained by adopting such a configuration that the lip part 42 has a length and a shape extending beyond the imaginary line CL and at least a portion of the lip part 42 has a shape extending to be closer to the bottom surface part 21 of the window frame 20 as approaching from the main body 41 side to the peripheral wall part 22 side of the window frame 20.

[Sixth Embodiment]

Figure 17:
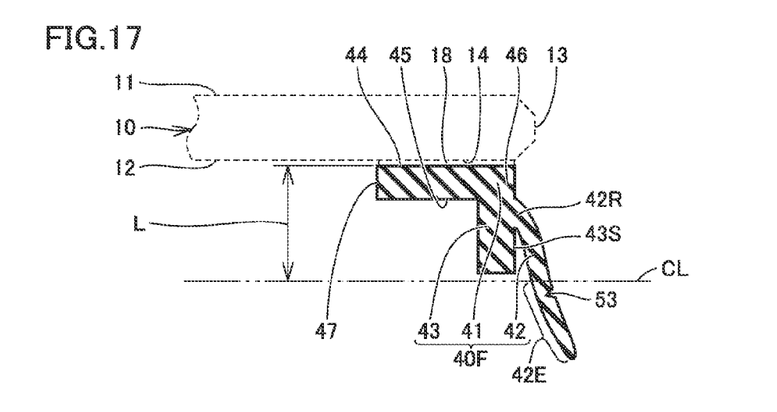
FIG. 17 is a cross-sectional view showing a state when a window molding for a vehicle in a sixth embodiment is in an unloaded state.

A window molding 40F shown in FIG. 17 is different from the window molding 40E shown in the above-described fifth embodiment (FIG. 16) in terms of the position of a base part 42R of the lip part 42. The dam part 43 has a side surface 43S located on the peripheral wall part 22 (not shown) side, and the base part 42R of the lip part 42 is provided near exactly the center (in the vertical direction on the drawing sheet of FIG. 17) of this side surface 43S.

Even in this configuration, the function and effect similar to those of the above-described embodiments can be obtained by adopting such a configuration that the lip part 42 has a length and a shape extending beyond the imaginary line CL and at least a portion of the lip part 42 has a shape extending to be closer to the bottom surface part 21 of the window frame 20 as approaching from the main body 41 side to the peripheral wall part 22 side of the window frame 20.

[Seventh Embodiment]

Figure 18:
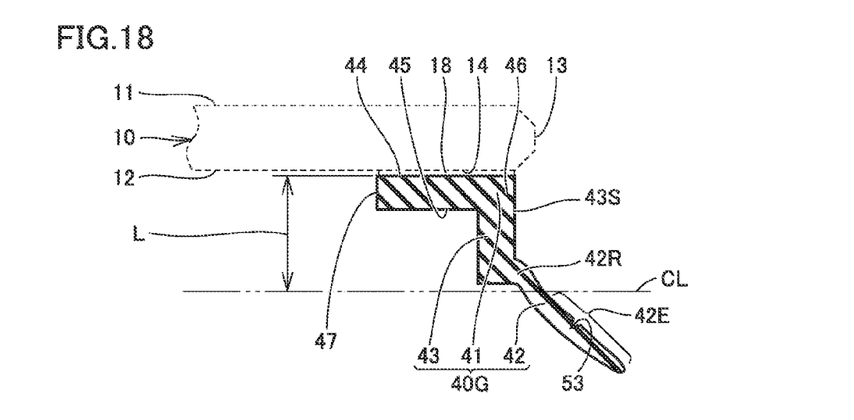
FIG. 18 is a cross-sectional view showing a state when a window molding for a vehicle in a seventh embodiment is in an unloaded state.

A window molding 40G shown in FIG. 18 is also different from the window molding 40E shown in the above-described fifth embodiment (FIG. 16) in terms of the position of the base part 42R of the lip part 42. The base part 42R of the lip part 42 of the window molding 40G is provided near a lower end (in the vertical direction on the drawing sheet of FIG. 18) of the side surface 43S.

Even in this configuration, the function and effect similar to those of the above-described embodiments can be obtained by adopting such a configuration that the lip part 42 has a length and a shape extending beyond the imaginary line CL and at least a portion of the lip part 42 has a shape extending to be closer to the bottom surface part 21 of the window frame 20 as approaching from the main body 41 side to the peripheral wall part 22 side of the window frame 20.

While the embodiments based on the present invention have been described above, the disclosure described above is illustrative and non-restrictive in every respect. The technical scope of the present invention is defined by the terms of the claims, and is intended to include any modifications within the meaning and scope equivalent to the terms of the claims.

REFERENCE SIGNS LIST

10 window; 11 outer surface; 12 inner surface; 13 edge; 14 outer peripheral part; 18 double-sided tape; 19 adhesive; 20 window frame; 21 bottom surface part; 21S surface; 22 peripheral wall part; 23 external surface part; 30, 30A, 30B, 40, 40A, 40B, 40C, 40D, 40E, 40F, 40G window molding; 31, 41 main body; 31A head part; 31B leg part; 32, 42 lip part; 32A root part; 32B bent part; 32C extending part; 32T tip; 33, 44 upper surface; 34, 45 lower surface; 35, 36, 43S, 47 side surface; 42E, 42F, 42G, 46 portion; 42M internal surface; 42N external surface; 42R base part; 43 dam part; 51, 52, 53 notch; 100 vehicle; C housing part; CL imaginary line; L1, L2, L3 width; S gap.

The invention claimed is:

1. A window molding for a vehicle, configured to be provided between a vehicle window and a window frame including a bottom surface part opposing an inner surface of the vehicle window and a peripheral wall part opposing an edge of the vehicle window, the window molding comprising:
   a main body including an upper surface configured to be affixed to the inner surface, the main body being configured to be arranged between the inner surface and the bottom surface part; and
   a lip part provided on a portion of the main body located on a side of the peripheral wall part,
   when the vehicle window and the window molding are assembled on the window frame, at least a portion of the lip part having a shape extending to be closer to the bottom surface part as approaching from a side of the main body to the side of the peripheral wall part,
   when the vehicle window and the window molding are assembled on the window frame, a distance from the upper surface of the main body to the bottom surface part being defined as L,
   when the window molding is in an unloaded state where the vehicle window and the window molding are not assembled on the window frame, the lip part of the window molding having a portion in which the distance from the upper surface of the main body is longer than L, and
   when the vehicle window and the window molding are assembled on the window frame, the lip part of the window molding has a portion which comes into contact with the bottom surface part.

2. The window molding for the vehicle according to claim 1, wherein
   the lip part includes an internal surface and an external surface located on a side farther away from the internal surface when viewed from a vehicle compartment, and
   a notch is provided in the internal surface or the external surface.

3. The window molding for the vehicle according to claim 2, wherein
   when the window molding is in the unloaded state, the notch provided in the lip part is formed at a position where the distance from the upper surface of the main body is longer than L.

4. The window molding for the vehicle according to claim 2, wherein
   the notch is provided in the internal surface and is provided in a base part of the lip part located between the main body and the lip part.

5. The window molding for the vehicle according to claim 1, wherein
   the lip part extends from a position adjacent to the upper surface of the main body.

6. The window molding for the vehicle according to claim 1, wherein
   the lip part includes an internal surface and an external surface located on a side farther away from the internal surface when viewed from a vehicle compartment, and
   a notch is provided in the internal surface and the external surface.

7. The window molding for the vehicle according to claim 6, wherein
   when the window molding is in the unloaded state, the notch provided in the lip part is formed at a position where the distance from the upper surface of the main body is longer than L.

8. The window molding for the vehicle according to claim 6, wherein
   the notch that is provided in the internal surface is provided in a base part of the lip part located between the main body and the lip part.

* * * * *